(12) United States Patent
Mikulenka et al.

(10) Patent No.: US 12,325,351 B2
(45) Date of Patent: Jun. 10, 2025

(54) HEADLIGHT ASSEMBLY WITH RELEASABLE BRACKET FOR PEDESTRIAN PROTECTION (PEDPRO)

(71) Applicant: Autosystems, a division of Magna Exteriors Inc., Aurora (CA)

(72) Inventors: Martin Mikulenka, Bolatice (CZ); Adam Pilčík, Opava-Kylesovice (CZ)

(73) Assignee: Autosystems, a division of Magna Exteriors Inc., Aurora (CA)

( * ) Notice: Subject to any disclaimer, the term of this patent is extended or adjusted under 35 U.S.C. 154(b) by 0 days.

(21) Appl. No.: 18/741,284

(22) Filed: Jun. 12, 2024

(65) Prior Publication Data

US 2025/0010784 A1    Jan. 9, 2025

Related U.S. Application Data

(60) Provisional application No. 63/525,075, filed on Jul. 5, 2023.

(51) Int. Cl.
    *B60Q 1/04*    (2006.01)
(52) U.S. Cl.
    CPC .................................. *B60Q 1/0495* (2022.05)
(58) Field of Classification Search
    CPC ..................................................... B60Q 1/0495
    See application file for complete search history.

(56) References Cited

U.S. PATENT DOCUMENTS

| | | |
|---|---|---|
| 7,004,608 B2 | 2/2006 | Goller |
| 9,221,387 B1 * | 12/2015 | Thorpe ................ B60Q 1/0495 |
| 11,572,010 B2 | 2/2023 | Kang et al. |
| 2003/0142503 A1 | 7/2003 | Ericsson et al. |
| 2006/0146556 A1 | 7/2006 | Arlon et al. |
| 2019/0077297 A1 * | 3/2019 | Kueppers ............. B60Q 1/0495 |
| 2023/0106355 A1 | 4/2023 | Steinhilb |

FOREIGN PATENT DOCUMENTS

| | | | |
|---|---|---|---|
| DE | 19732301 A1 | 2/1998 | |
| GB | 2506206 A * | 3/2014 | ........... B60Q 1/0491 |
| GB | 2506206 B | 3/2014 | |

OTHER PUBLICATIONS

US 11,305,723 B2, 04/2022, Ebner et al. (withdrawn)

* cited by examiner

*Primary Examiner* — Donald L Raleigh
(74) *Attorney, Agent, or Firm* — Dickinson Wright PLLC

(57) ABSTRACT

A releasable bracket for a headlight assembly of a vehicle includes: a fixed bracket portion configured to be attached to a structural component of the vehicle; and a component-side portion attached to the headlight assembly. The component-side portion is configured to engage the fixed bracket portion in a retained position for holding the headlight assembly to the structural component of the vehicle. One of the fixed bracket portion or the component-side portion includes a clip, and another one of the fixed bracket portion or the component-side portion includes a cage portion. The clip is configured to detach from the cage portion in response to application of an impact force on the headlight assembly. The clip is configured to re-engage the cage portion and to re-attach the fixed bracket portion to the cage portion after being detached therefrom.

20 Claims, 15 Drawing Sheets

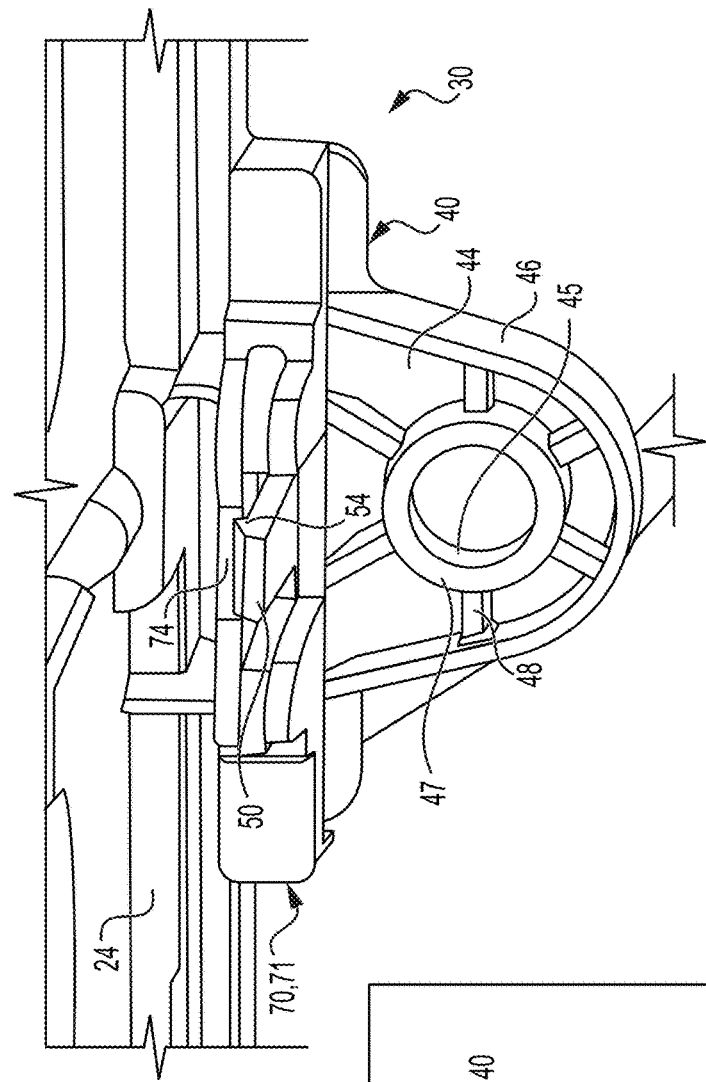
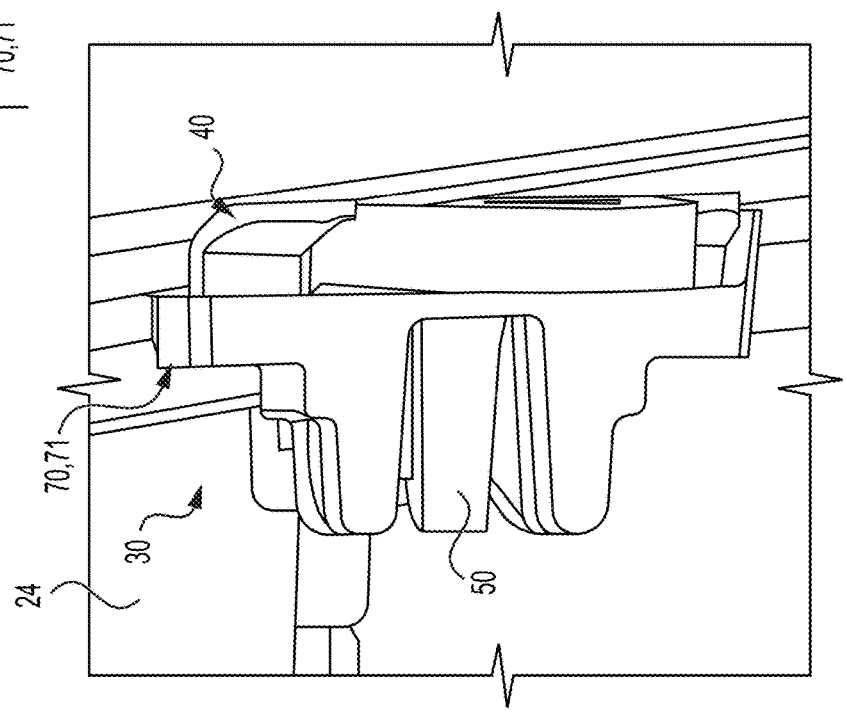
FIG. 7A
FIG. 7B

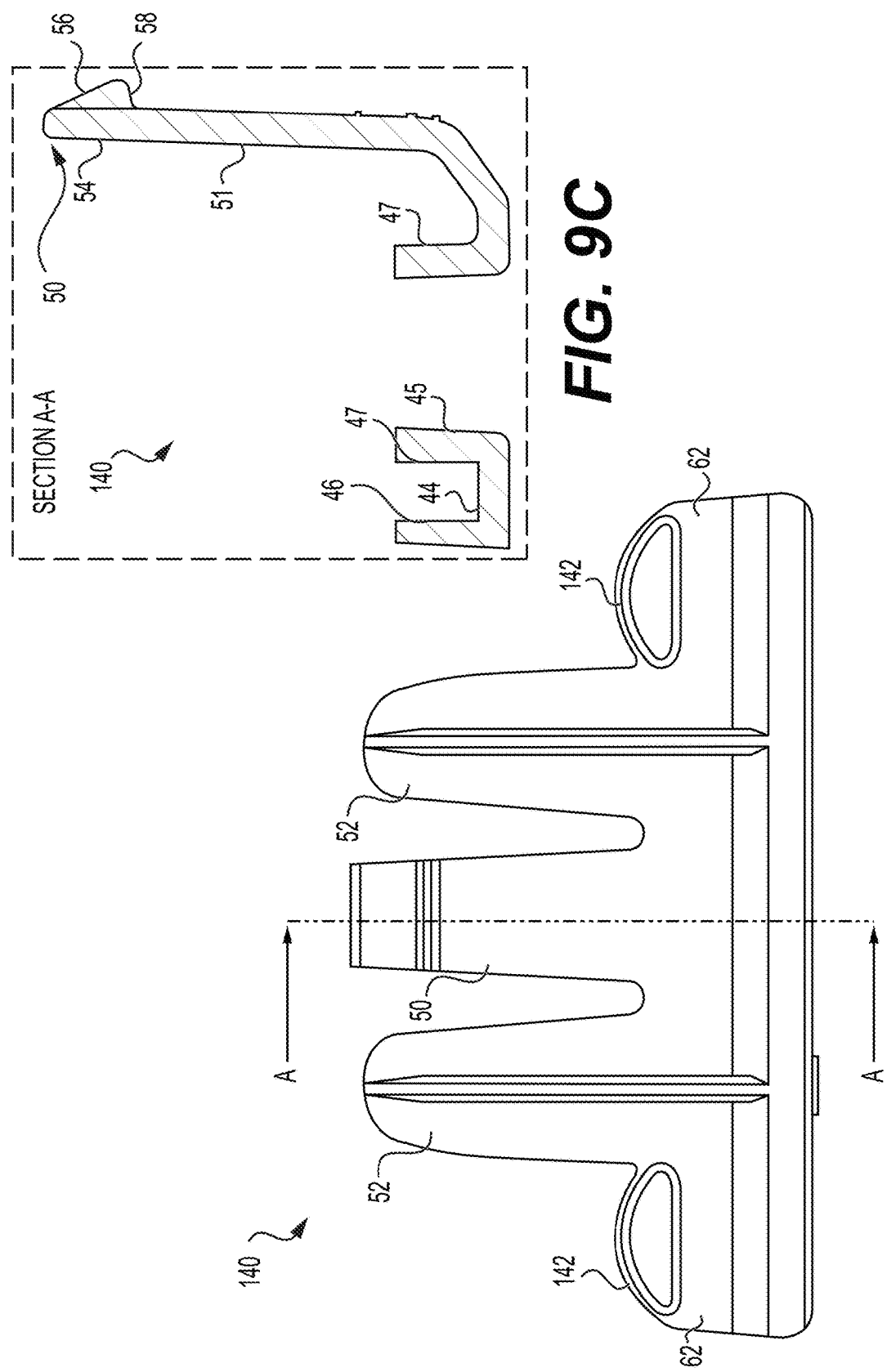

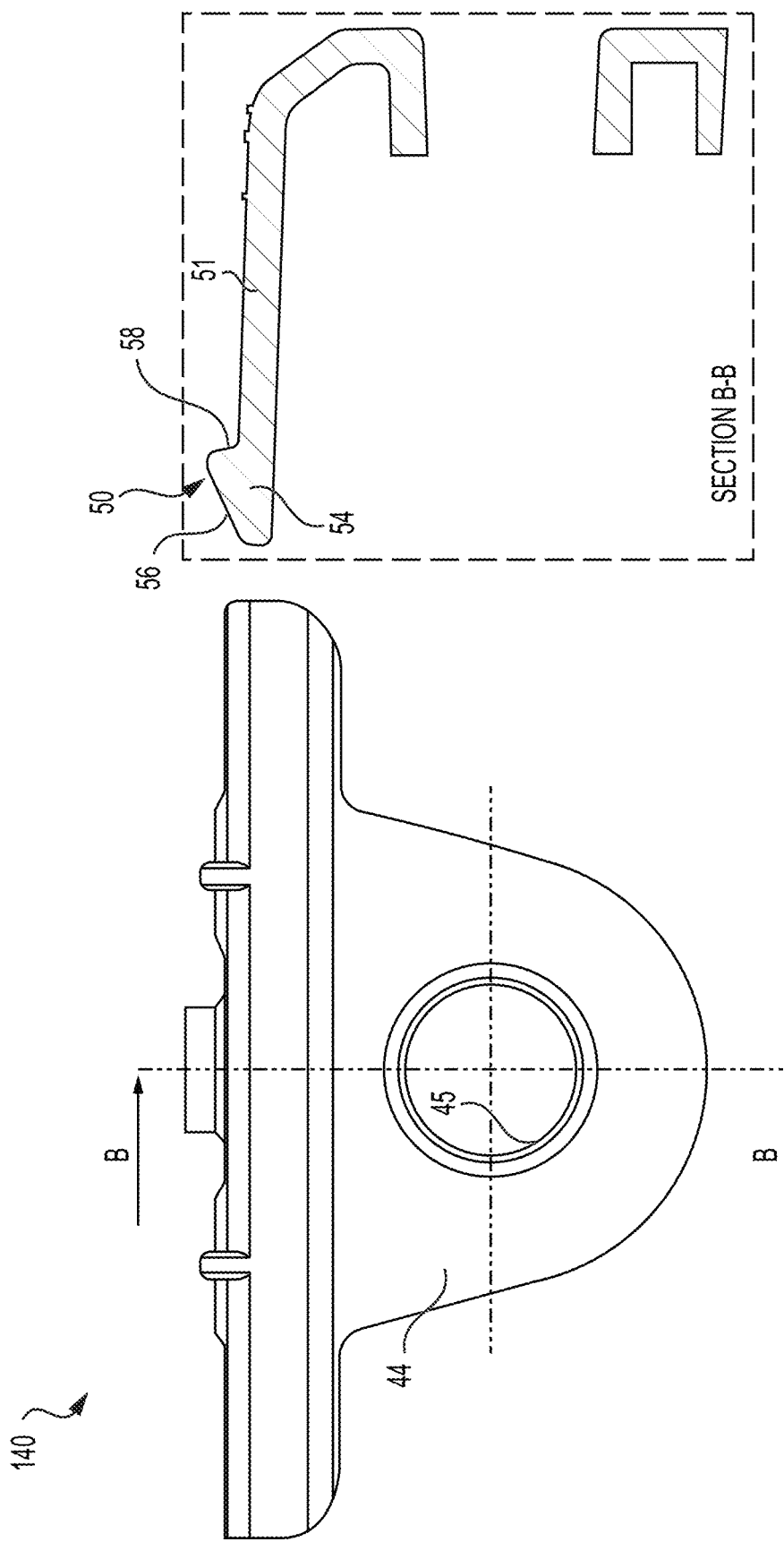

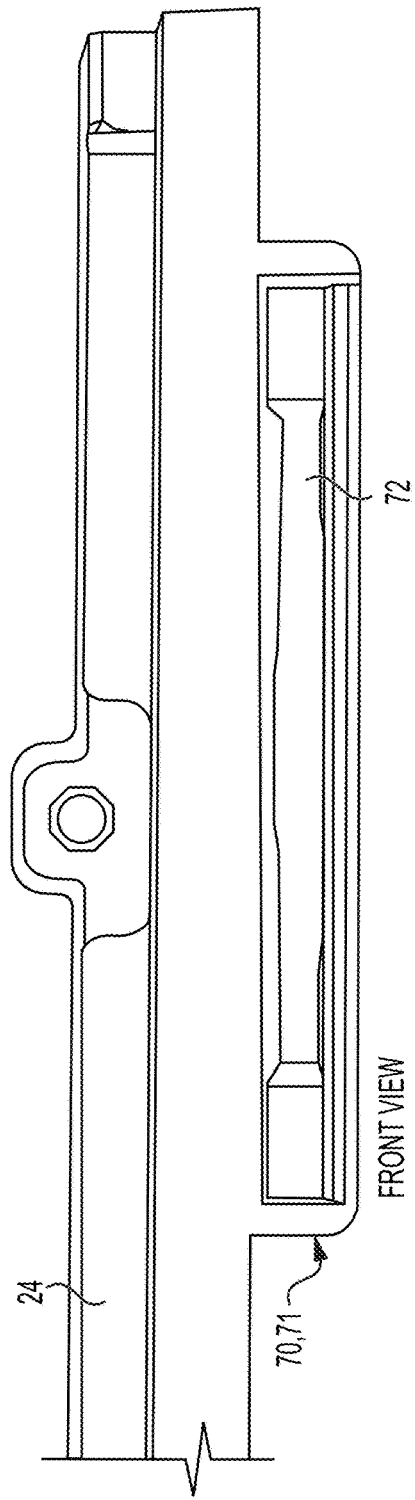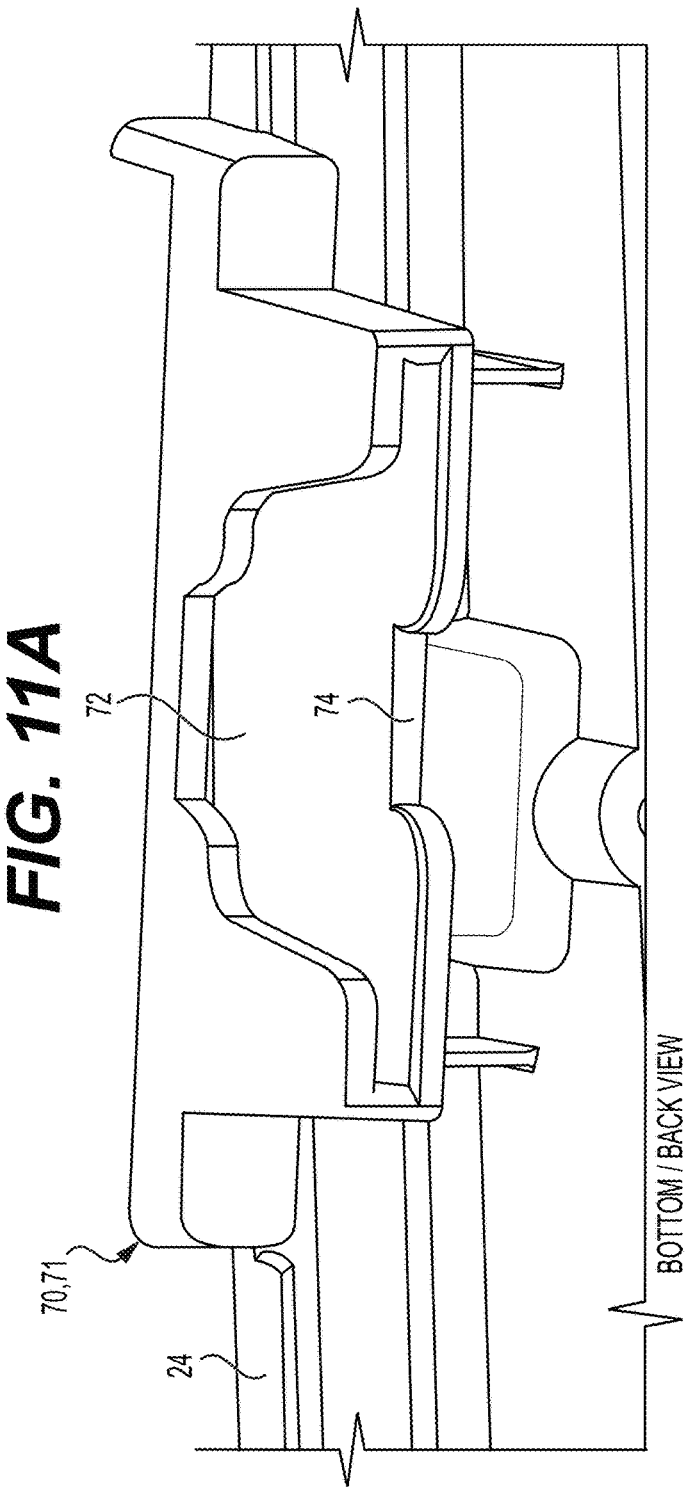

HEADLIGHT ASSEMBLY WITH RELEASABLE BRACKET FOR PEDESTRIAN PROTECTION (PEDPRO)

CROSS REFERENCE TO RELATED APPLICATIONS

This U.S. utility patent application claims the benefit of U.S. Provisional Patent Application No. 63/525,075 filed Jul. 5, 2023, the contents of which is incorporated herein by reference in its entirety.

FIELD

The present disclosure relates to mounting a headlight assembly to a structure of a vehicle. More specifically, the present disclosure relates to a releasable bracket for mounting a headlight assembly.

BACKGROUND

This section provides background information related to the present disclosure which is not necessarily prior art.

Mounting brackets for headlight assemblies of a vehicle may be configured to allow the headlight to be displaced relative to a vehicle structure in response to application of a pushing force, such as may be caused by a collision with a pedestrian. Such mounting brackets may include breakable or frangible portions that are configured to break in response to the pushing force. In some cases, frangible portions may be included as a part of a housing of the headlight assembly. While frangible mounting brackets provide the desired pedestrian protection (PedPro) function, they can be very expensive to replace.

SUMMARY

This section provides a general summary of the disclosure, and is not a comprehensive disclosure of its full scope or all of its features.

The present disclosure provides a releasable bracket for a headlight assembly of a vehicle. The releasable bracket includes a fixed bracket portion configured to be attached to a structural component of the vehicle. The releasable bracket also includes a component-side portion attached to the headlight assembly and configured to engage the fixed bracket portion in a retained position for holding the headlight assembly to the structural component of the vehicle. One of the fixed bracket portion or the component-side portion includes a clip, and another one of the fixed bracket portion or the component-side portion includes a cage portion.

In some embodiments, the clip is configured to detach from the cage portion in response to application of an impact force on the headlight assembly, and the clip is configured to re-engage the cage portion and to re-attach the fixed bracket portion to the cage portion after being detached therefrom.

In some embodiments, the fixed bracket portion includes the clip and the component-side portion includes the cage portion.

In some embodiments, the fixed bracket portion includes the cage portion and the component-side portion includes the clip.

In some embodiments, the clip includes a latch portion having a catch surface configured to engage a lip of the cage portion in a retained portion.

In some embodiments, the fixed bracket portion includes at least one guide arm configured to fit within an aperture of the cage portion and to guide the clip into position to engage the cage portion in the retained position.

In some embodiments, the at least one guide arm includes two guide arms, with the clip disposed between the two guide arms.

In some embodiments, the clip is configured to detach from the cage portion in response to the application of the impact force of at least about 55 Newtons.

In some embodiments, the headlight assembly includes a housing, and wherein the cage portion is integrally molded with the housing of the headlight assembly.

In some embodiments, the clip includes a beam with a catch surface extending therefrom, the catch surface configured to engage a lip of the cage portion in the retained position.

In some embodiments, the catch surface defines an angle of greater than 90-degrees relative to the beam of the clip.

In some embodiments, the releasable bracket further includes a spring configured to bias the fixed bracket portion away from the cage portion with the releasable bracket in the retained position.

In some embodiments, the spring is integrally molded with the fixed bracket portion.

In some embodiments, the spring includes two arc-shaped structures disposed on opposite sides of the clip.

The present disclosure also provides a headlight assembly for a vehicle. The headlight assembly includes a housing, at least one deformable bracket, and a releasable bracket. The at least one deformable bracket is configured to hold the housing to a structural component of the vehicle, the deformable bracket configured to deform in response to application of an impact force on the headlight assembly. The releasable bracket includes: a fixed bracket portion configured to be attached to a structural component of the vehicle, and a component-side portion. The component-side portion is attached to the headlight assembly and is configured to engage the fixed bracket portion in a retained position for holding the headlight assembly to the structural component of the vehicle. One of the fixed bracket portion or the component-side portion includes a clip, and another one of the fixed bracket portion or the component-side portion includes a cage portion. The clip is configured to detach from the cage portion in response to application of an impact force on the headlight assembly. The clip is also configured to re-engage the cage portion and to re-attach the fixed bracket portion to the cage portion after being detached therefrom.

In some embodiments, the fixed bracket portion includes the clip and the component-side portion includes the cage portion.

In some embodiments, the fixed bracket portion includes the cage portion and the component-side portion includes the clip.

In some embodiments, the at least one deformable bracket is disposed adjacent to a front surface of the housing, and wherein the releasable bracket is disposed on to a rear surface of the housing.

In some embodiments, the at least one deformable bracket includes two or more of the deformable brackets.

In some embodiments, the releasable bracket is disposed between two of the two or more of the deformable brackets.

The present disclosure also provides a releasable bracket for a headlight assembly of a vehicle. The releasable bracket includes a fixed bracket portion including a clip; and a cage portion attached to the headlight assembly and configured to engage the clip in a retained position for holding the headlight assembly to a structural component of the vehicle. The clip is configured to detach from the cage portion in response to application of an impact force on the headlight assembly. The clip is configured to re-engage the cage portion and to re-attach the fixed bracket portion to the cage portion after being detached therefrom. The clip includes a latch portion having a catch surface configured to engage a lip of the cage portion in a retained portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7A shows a rear view of the releasable bracket, in accordance with an aspect of the present disclosure;

FIG. 7B shows a bottom view of the releasable bracket, in accordance with an aspect of the present disclosure;

FIGS. 9A-9E show various views of a second fixed bracket portion of the releasable bracket, in accordance with an aspect of the present disclosure;

FIG. 11A shows a front view of a cage portion of the releasable bracket, in accordance with an aspect of the present disclosure;

FIG. 11B shows a bottom view of the cage portion of the releasable bracket, in accordance with an aspect of the present disclosure;

Corresponding reference numerals indicate corresponding parts throughout the several views of the drawings.

DETAILED DESCRIPTION

Figure 1:
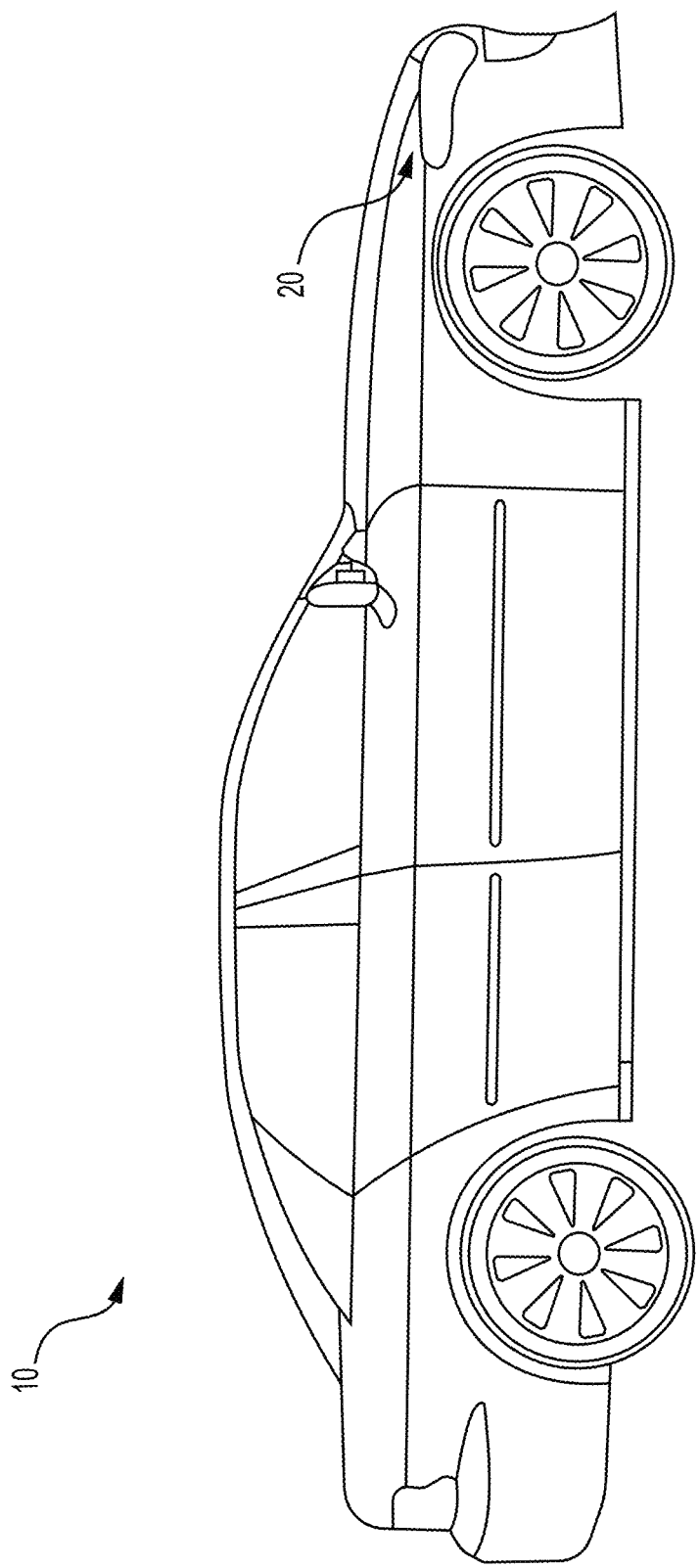
FIG. 1 shows a side view of a vehicle.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is an objective of the present disclosure to provide a black taillight assembly having improved efficiency. More specifically, it is an objective of the present disclosure to provide a black taillight assembly with efficiency between 2× and 10× of conventional black taillights.

The present disclosure provides a black taillight using a phosphor layer sandwiched between a short-pass filter and a long-pass filter. Shorter wavelength light (for example blue) pass through the short-pass filter and excites the phosphor layer. The phosphor layer converts the shorter length light to a higher wavelength (e.g. red or amber for a taillight). That light then passes through the long-pass filter. When seen from outside the vehicle, the long-pass filter and the short-pass filter block outside light from passing through, effectively making the assembly look black.

The present disclosure provides example embodiments of a black taillight assembly for a vehicle. Such a black taillight assembly may appear black or very dark when in an OFF state, and which illuminates when in an OFF state. For example, such a black taillight assembly may emit red and/or amber light, depending on a particular function, such as for a turn signal indicator or a brake light. The principles of the present disclosure may be implemented in other exterior lights for a vehicle, such as in a headlight or in a side marker light.

FIG. 1 shows a side view of a vehicle 10 including a headlight assembly 20. The headlight assembly 20 of the present disclosure may include one or more releasable brackets that hold a housing of the headlight assembly in position on the vehicle 10, while also detaching to allow the housing to be displaced in response to application of an impact force. The releasable brackets of the present disclosure maybe re-attached after being detached.

Figure 2:
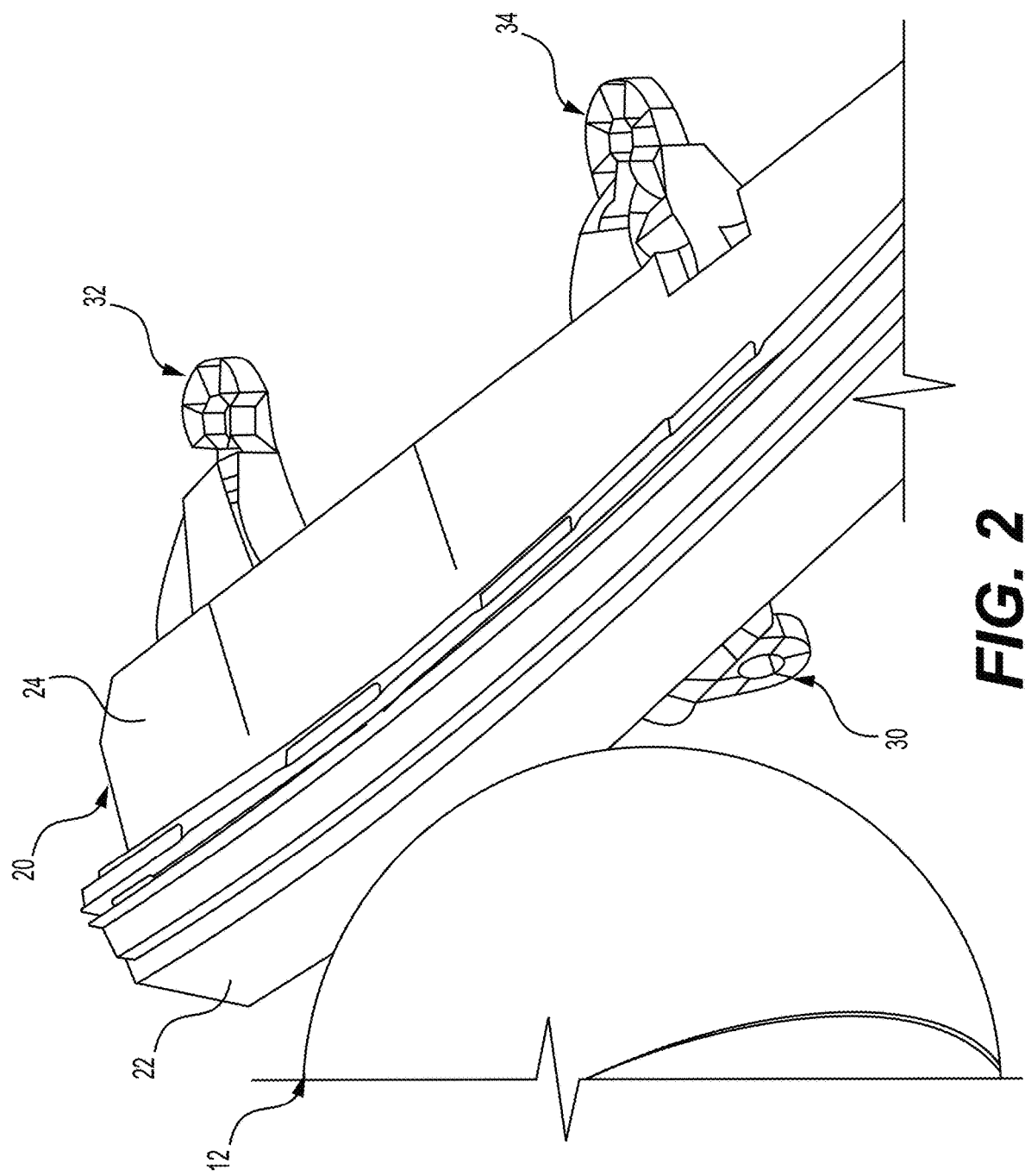
FIG. 2 shows a perspective view of a section of a headlight assembly, in accordance with an aspect of the present disclosure.

FIG. 2 shows a perspective view of a section of a headlight assembly 20 of the present disclosure. The headlight assembly 20 includes a lens portion 22 and a housing 24 for containing one or more illumination sources (not shown). FIG. 2 shows a releasable bracket 30, a first deformable bracket 32, and a second deformable bracket 34. Each of the brackets 30, 32, 34 may function to hold the headlight assembly 20 to corresponding structural components of the vehicle 10, such as chassis or frame components. FIG. 2 also shows an external object 12 contacting a front surface of the headlight assembly 20, which may simulate an impact force being applied as a result of a collision between the vehicle 10 and a pedestrian. The brackets 30, 32, 34 may each be configured to allow some relative motion between the headlight assembly 20 and the corresponding structural components of the vehicle 10 in order to absorb energy in response to application of an impact force from a collision with the object 12.

Figure 3:
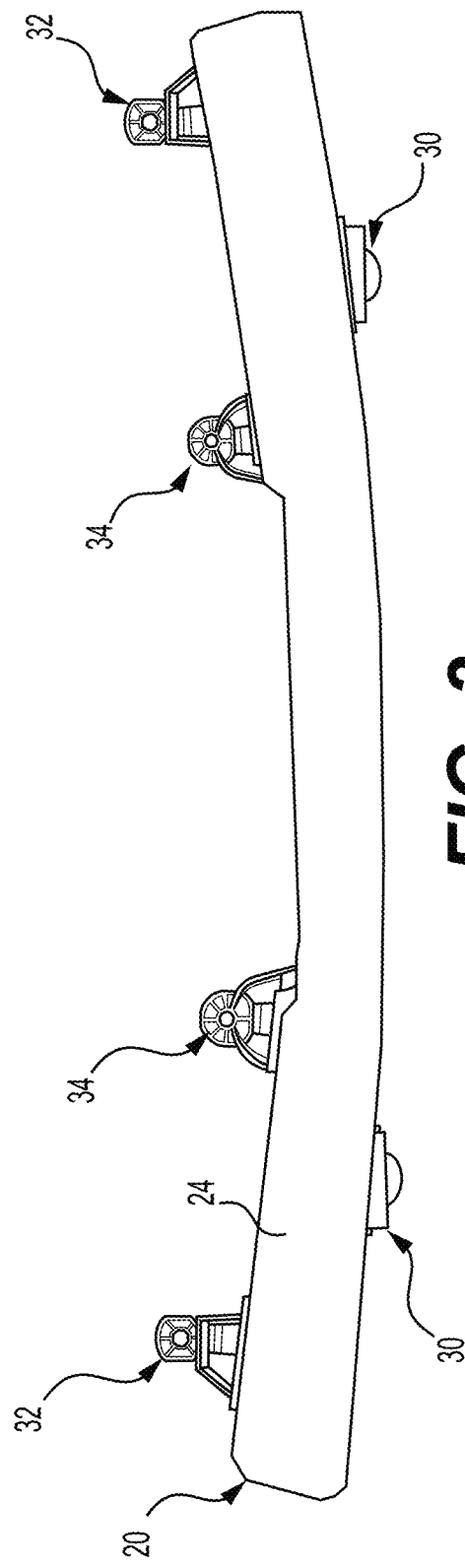
FIG. 3 shows a top view of the headlight assembly, in accordance with an aspect of the present disclosure.
Figure 4:
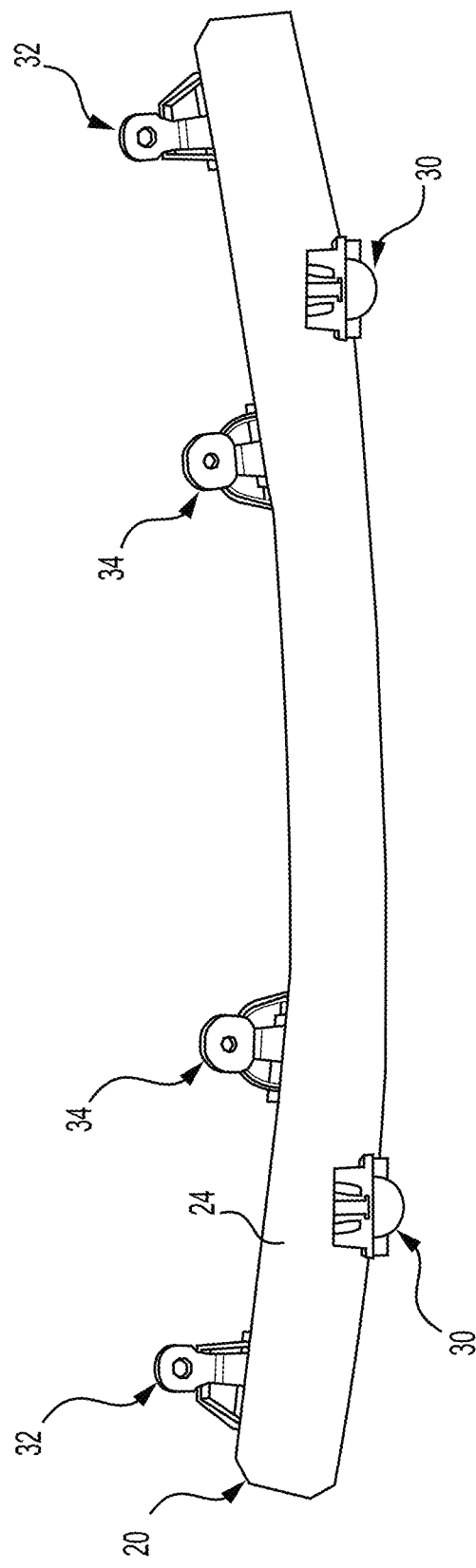
FIG. 4 shows a bottom view of the headlight assembly, in accordance with an aspect of the present disclosure.

FIG. 3 shows a top view of the headlight assembly 20, and FIG. 4 shows a bottom view of the headlight assembly 20. As shown, the headlight assembly 20 includes two of the releasable brackets 30, each located on a bottom surface of the housing 24 and adjacent to a front surface of the housing 24. The deformable brackets 32, 34 are each located on a rear surface of the housing 24. Each of the releasable brackets 30 is disposed about midway between a corresponding one of the first deformable brackets 32 and a corresponding one of the second deformable brackets 34. With each of the left side and the right side of the headlight assembly 20 having a mirror-image configuration with one of each of the three different brackets 30, 32, 34. The first deformable brackets 32 and the second deformable brackets 34 may each be re-positioned to their original configuration, and re-used after being deformed.

Figure 5:
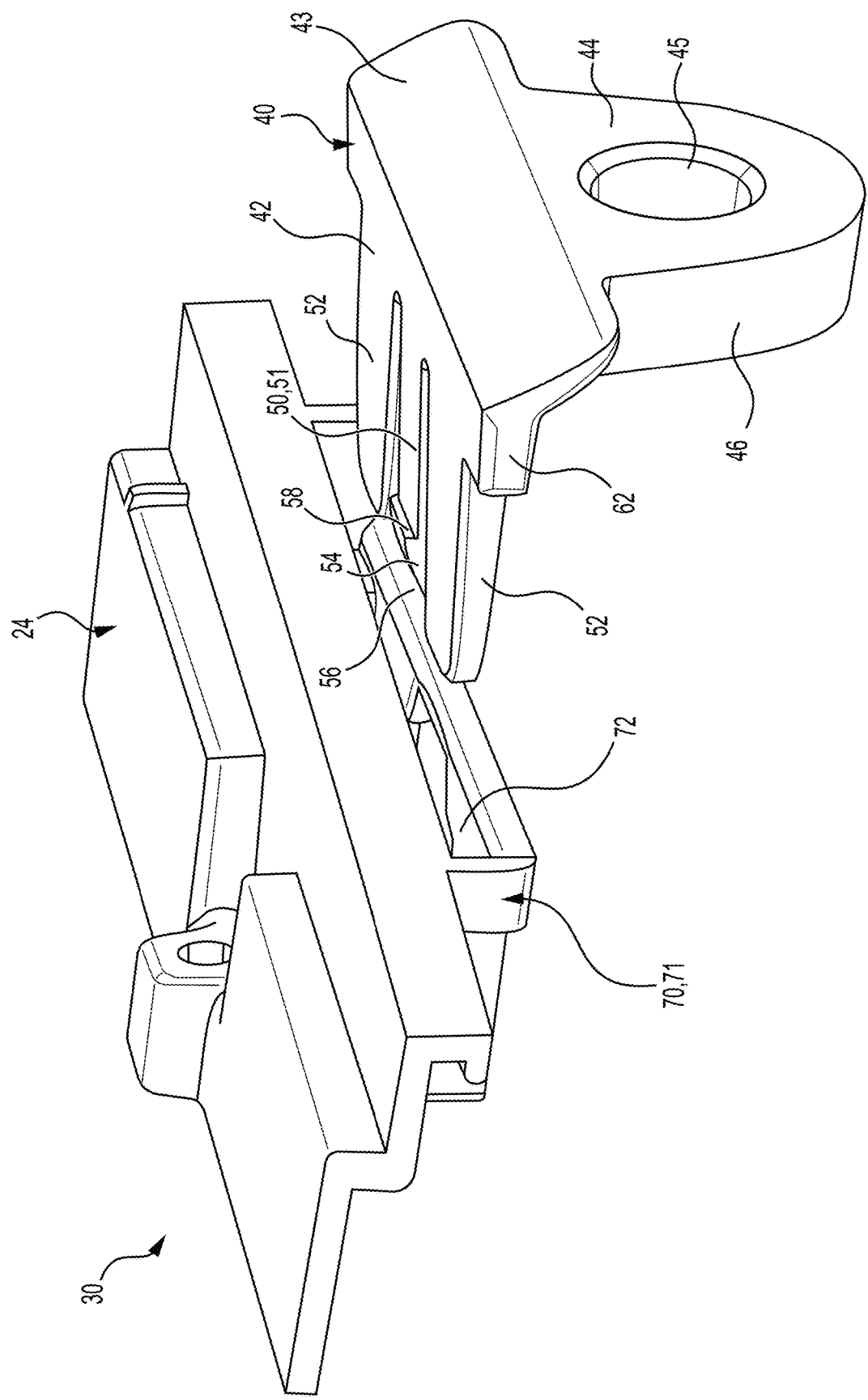
FIG. 5 shows a perspective view of a releasable bracket for a headlight assembly, in accordance with an aspect of the present disclosure.

FIG. 5 shows a perspective view of the releasable bracket 30. As shown, the releasable bracket 30 includes a first fixed bracket portion 40 that is configured to be attached to a structural component of the vehicle. The first fixed bracket portion 40 defines an L-shape with an upper portion 42 extending generally horizontally and connected to a mounting flange 44 that extends generally vertically. An outside sloped surface 43 extends between the upper portion 42 and the mounting flange 44. The mounting flange 44 defines a mounting hole 45 for receiving a fastener, such as a screw or nut, for attaching the first fixed bracket portion 40 to the structural component of the vehicle. A peripheral wall 46 surrounds the mounting flange 44 about the mounting hole 45 and extends perpendicularly thereto. The upper portion 42 of the first fixed bracket portion 40 includes a clip 50, and two guide arms 52 that each extend in a common plane generally perpendicularly to the mounting flange 44. The upper portion 42 of the first fixed bracket portion 40 also includes two shoulders 62 located outboard of the two guide arms 52 and which extend in the same common plane with the clip 50 and the two guide arms 52.

The clip 50 includes a beam 51 with a latch portion 54 opposite from the mounting flange 44. The latch portion 54 includes a ramp 56 that faces upwardly and away from the mounting flange 44. The latch portion 54 also includes a catch surface 58 extending upwardly from the beam 51 and facing toward the mounting flange 44.

The releasable bracket 30 also includes a component-side portion 70 that is attached to the housing 24. The component-side portion 70 includes a cage portion 71 that defines a rectangular aperture 72 configured to receive the clip 50 and the guide arms 52 of the first fixed bracket portion 40. The cage portion 71 is configured to engage the clip 50 in a retained position for holding the headlight assembly 20 to the structural component of the vehicle. More specifically, the catch surface 58 is configured to engage a lip (not shown in FIG. 5) of the cage portion 71 with the releasable bracket 30 in a the retained position.

The clip 50 is configured to detach from the cage portion 71 in response to application of an impact force on the headlight assembly 20. The clip 50 is also configured to re-engage the cage portion 71 and to re-attach the first fixed bracket portion 40 to the cage portion 71 after being detached therefrom.

In an alternative arrangement, the component-side portion 70 may include the clip 50 and/or the guide arms 52, and the first fixed bracket portion 40 may include the cage portion 71. For example, the clip 50 may be attached to the housing 24 of the headlight assembly 20 and the first fixed bracket portion 40 may include the cage portion 71 that receives the clip 50 for releasably attaching the headlight assembly 20 to the structural component of the vehicle 10. In this alternative arrangement, the clip 50 may face toward a front of the vehicle 10 and be configured to move rearwardly with the headlight assembly 20 to detach from the (fixed) cage portion 71 in response to application of an impact force on the headlight assembly 20.

Figure 6B:
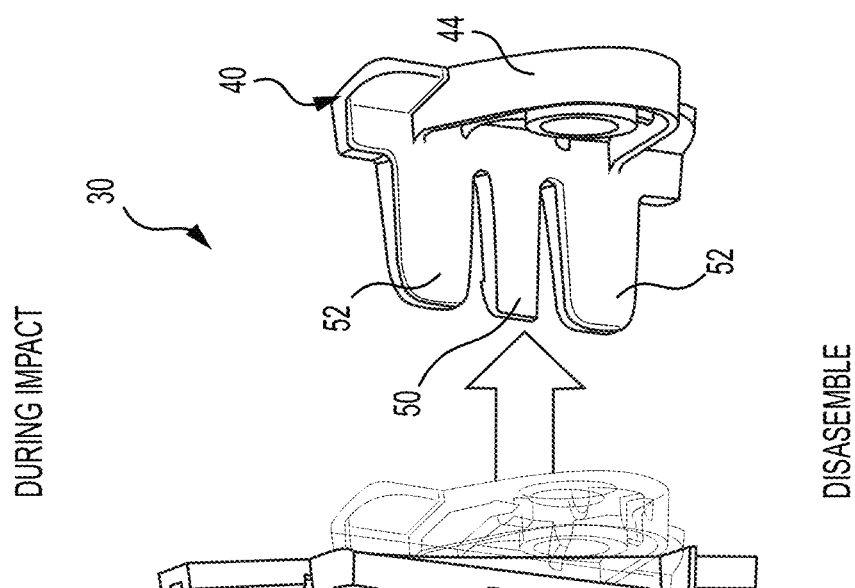
FIGS. 6A-6B show the releasable bracket in an attached configuration and in a detached configuration, respectively.
Figure 6A:
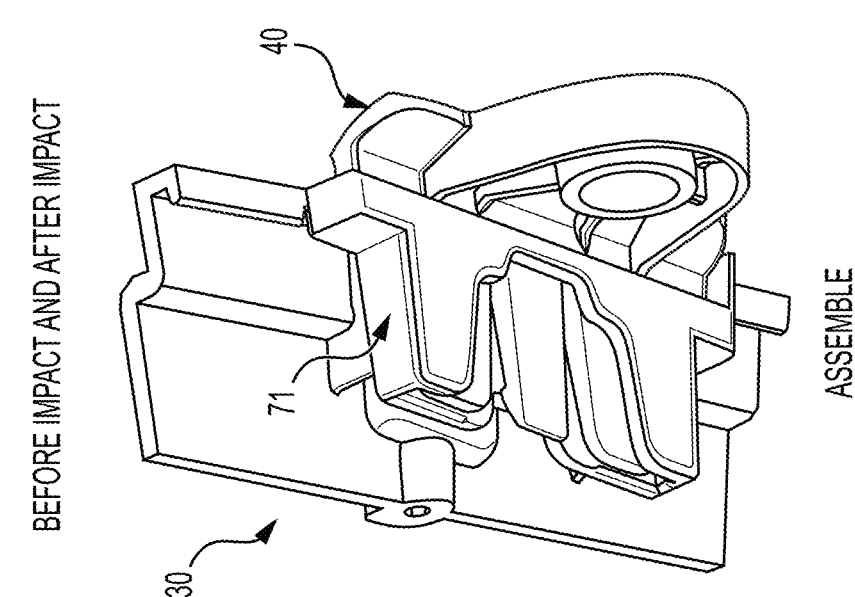

FIGS. 6A-6B show the releasable bracket 30 in an attached configuration and in a detached configuration, respectively. The attached configuration shown in FIG. 6A includes the first fixed bracket portion 40 engaging and attached to the cage portion 71 by the clip 50. The releasable bracket 30 may be moved from the assembled configuration shown in FIG. 6A to the detached configuration, which may also be called a disassembled configuration, in response to an impact force on the headlight assembly. The releasable bracket 30 may be re-attached back to the assembled configuration shown in FIG. 6A after being in the detached configuration.

FIGS. 7A-7B each show additional views of the releasable bracket 30 in the attached configuration. FIG. 7A shows the lip 74 of the cage portion 71 contacting and retaining the latch portion 54 of the clip 50. FIG. 7A also shows additional structural details of the first fixed bracket portion 40 including a tubular wall 47 that surrounds the mounting hole 45 and which extends perpendicularly from the mounting flange 44. Six reinforcement ribs 48 extend radially outwardly from the tubular wall 47 adjacent the mounting flange. Four of the reinforcement ribs 48 extend to an inner surface of the peripheral wall 46. The reinforcement ribs 48 may add stiffness to the first fixed bracket portion 40. The first fixed bracket portion 40 may be a molded piece, which may be made of a polymer material, such as a fibre reinforced plastic. FIGS. 7A-7B also show the guide arms 52, which may aid in leading the clip 50 of the first fixed bracket portion 40 into proper alignment with the cage portion 71 and to limit side-to-side motion with the releasable bracket 30 in the assembled configuration.

The cage portion 71 may also be a molded piece, which may be formed separately from the fixed bracket portion, and which may be formed of a same material or a different material. The cage portion 71, the clip 50, and/or the guide arms 52 may be integrally formed with the housing 24 of the headlight assembly 20.

Figure 8A:
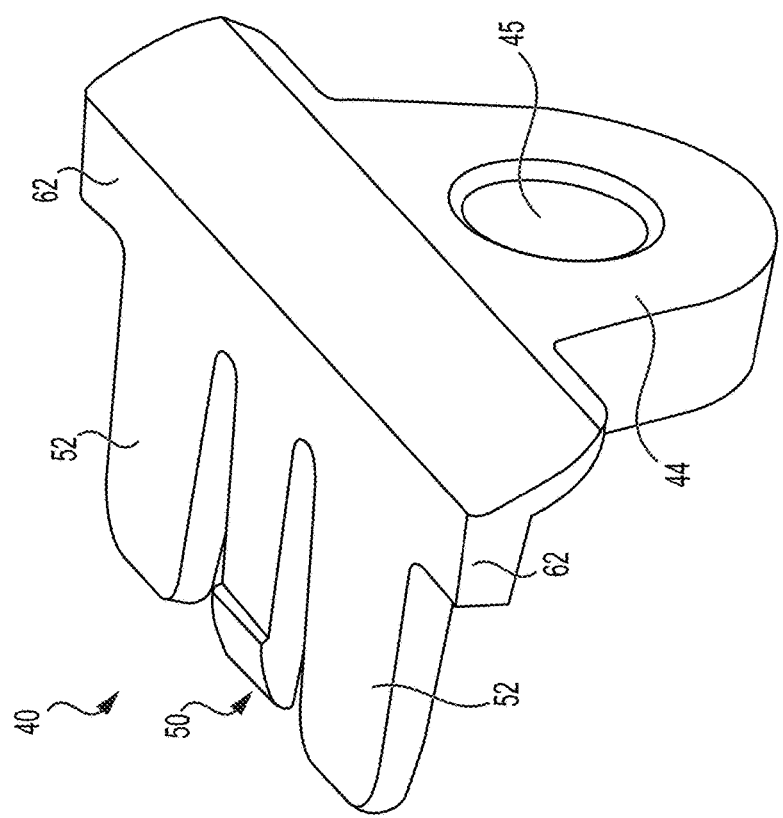
FIG. 8A shows a perspective top view of a fixed bracket portion of the releasable bracket, in accordance with an aspect of the present disclosure.
Figure 8B:
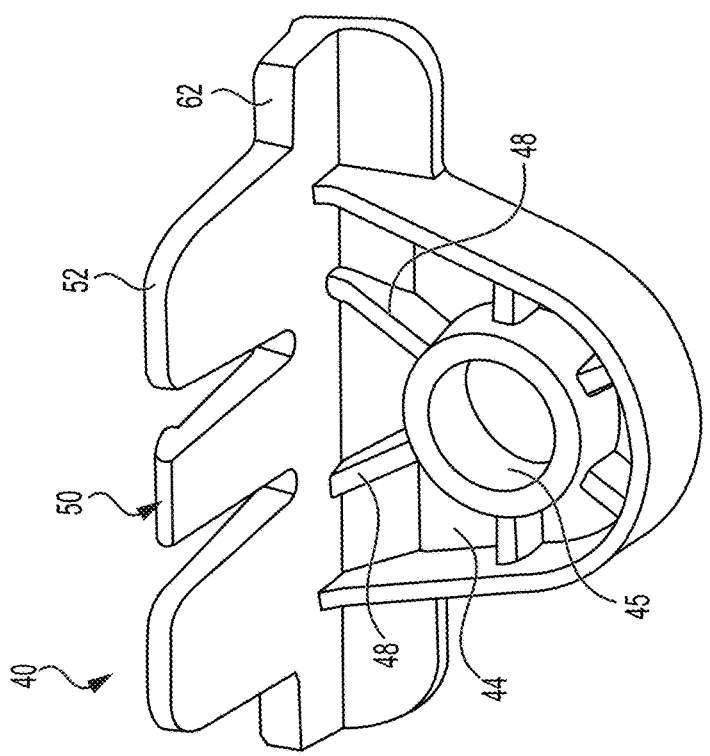
FIG. 8B shows a perspective back view of a fixed bracket portion of the releasable bracket, in accordance with an aspect of the present disclosure.
Figure 9A:
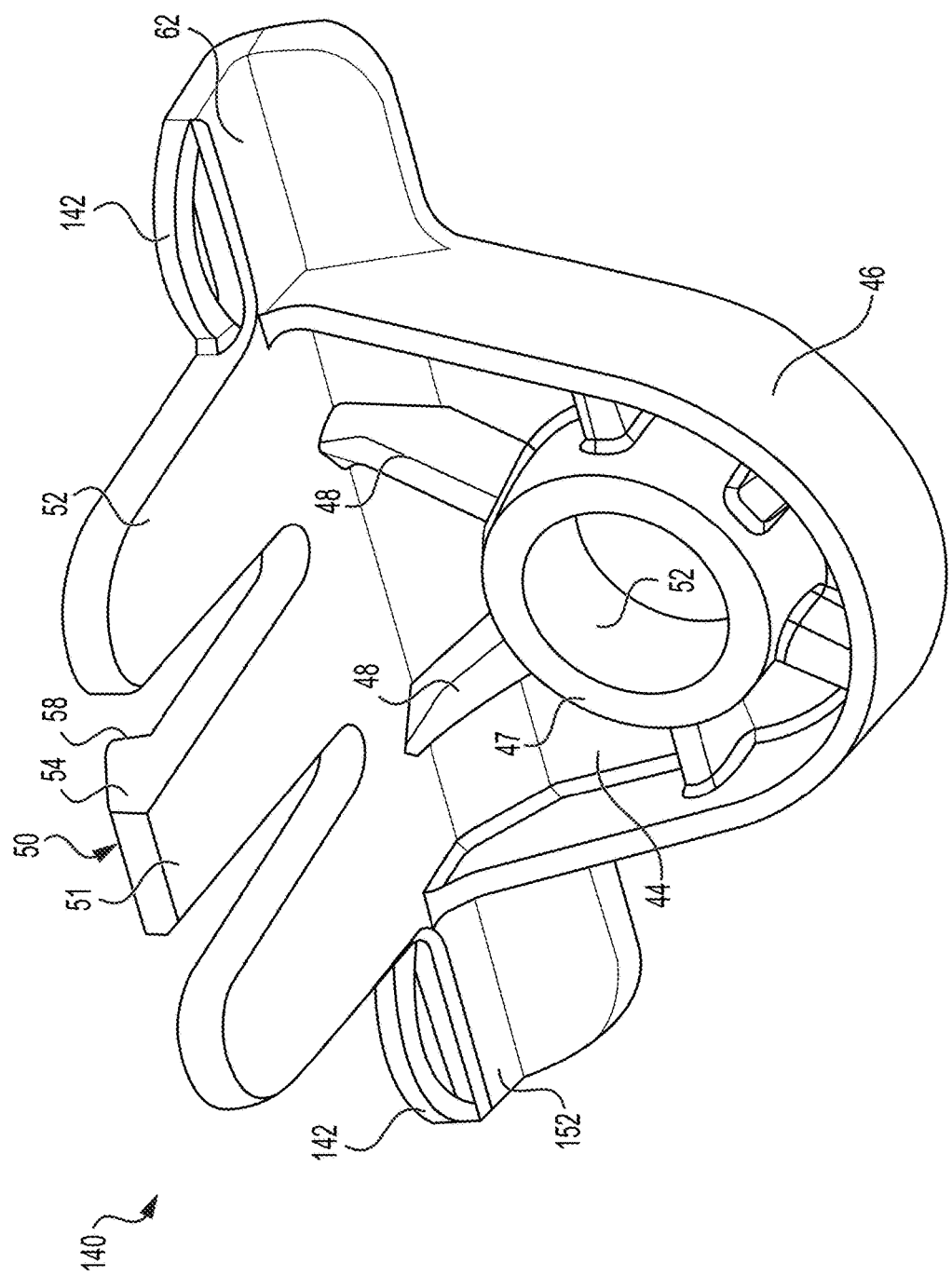

FIGS. 8A-8B show additional views of the first fixed bracket portion 40 of the releasable bracket 30.

FIGS. 9A-9E show various views of a second fixed bracket portion 140 of the releasable bracket 30. The second fixed bracket portion 140 may be used in place of the first fixed bracket portion 40 and may be similar or identical to the first fixed bracket portion 40, except for differences described herein. The second fixed bracket portion 140 includes a spring 142 that is formed as an arc-shaped structure on an inner surface of each of the shoulders 62, opposite from the mounting flange 44. The springs 142 may be configured to bias the second fixed bracket portion 140 away from the component-side portion 70 with the releasable bracket 30 in the retained position. The springs 142 may, therefore, prevent chatter or rattling therebetween. In some embodiments, the springs 142 may be integrally molded with the second fixed bracket portion 140. Alternatively or additionally, the springs may include other arrangements, such as coil springs or a compressible foam located between the fixed bracket portion 40, 140 and the component-side portion 70.

As best shown in the cross-sectional views of FIGS. 9C and 9E, the catch surface 58 may define an angle of greater than 90-degrees relative to the beam 51 of the clip 50. This angle of greater than 90-degrees may cause the beam 51 to be deflected downwardly for releasing the latch portion 54 from the cage portion 71 in response to application of an impact force.

Figure 10:
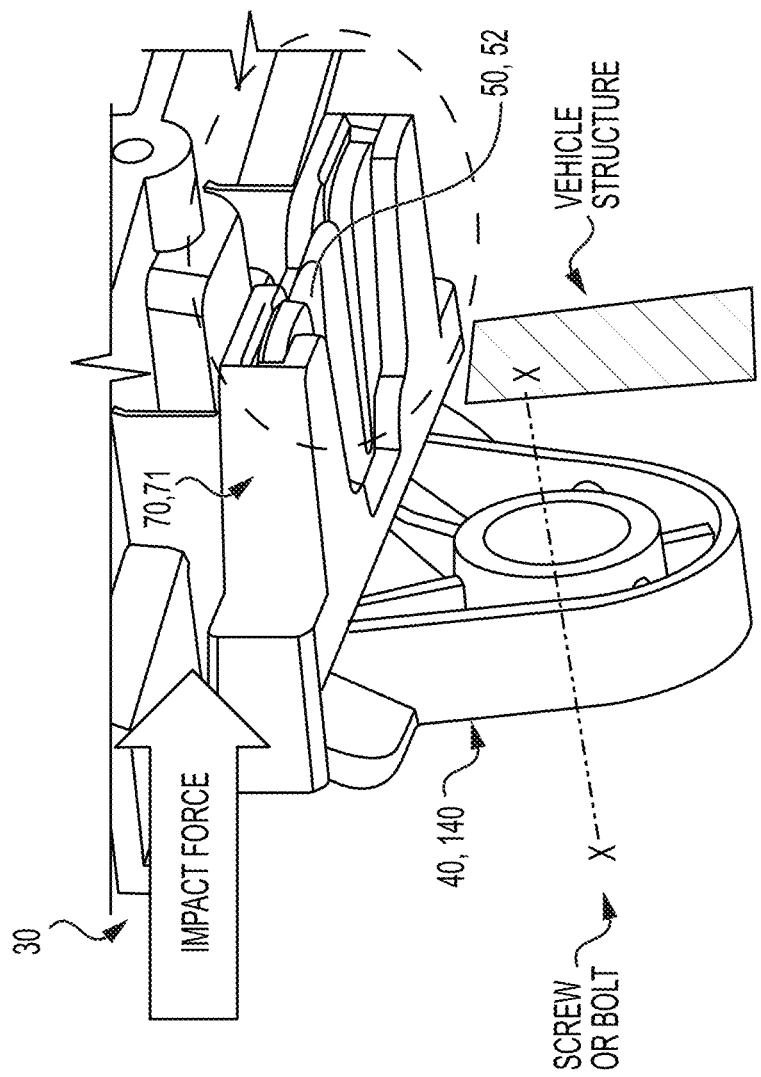
FIG. 10 shows a perspective view of parts of the releasable bracket detaching from one another in response to an impact force, in accordance with an aspect of the present disclosure.
Figure 12A:
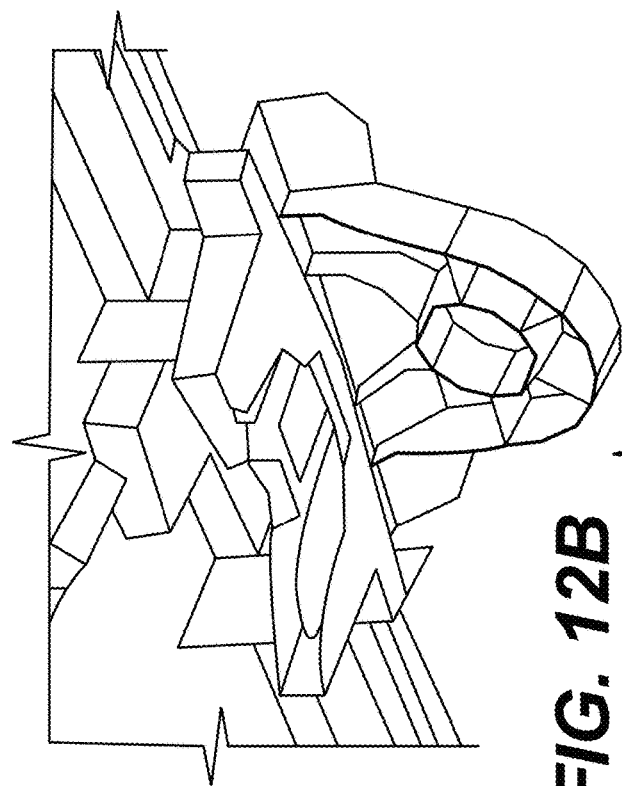
FIGS. 12A-12D show the releasable bracket at progressive steps of detaching in response to an impact force on the headlight assembly, in accordance with an aspect of the present disclosure.
Figure 12B:
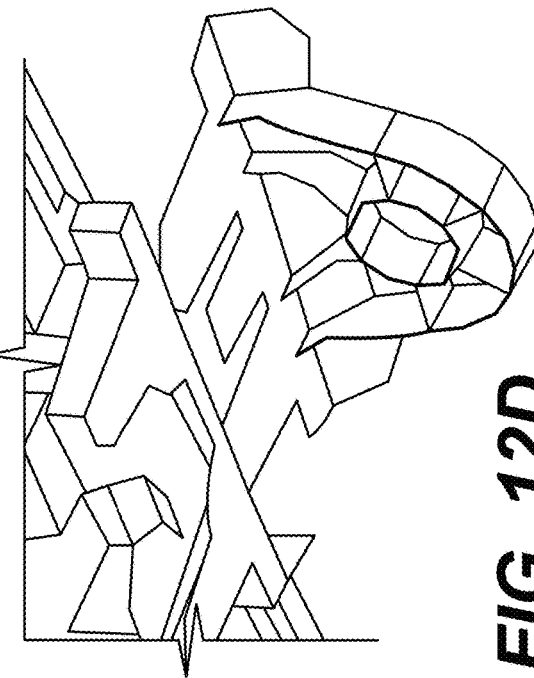
Figure 12C:
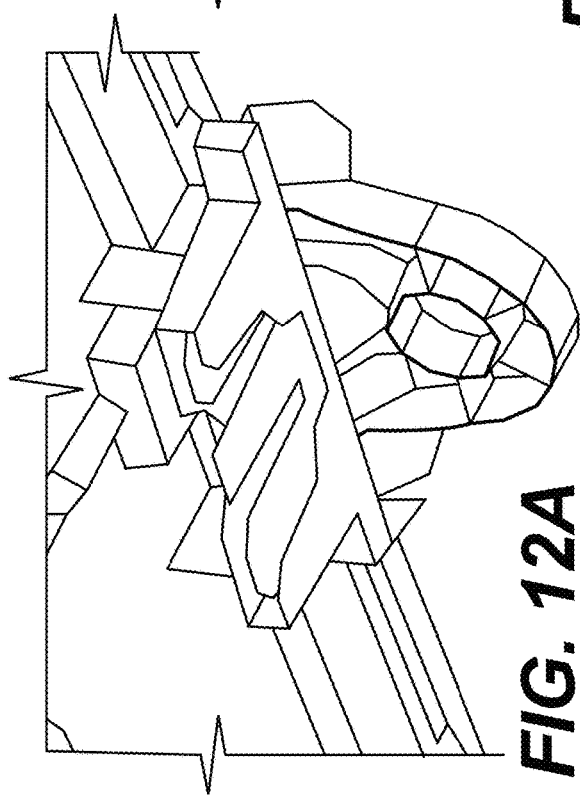
Figure 12D:
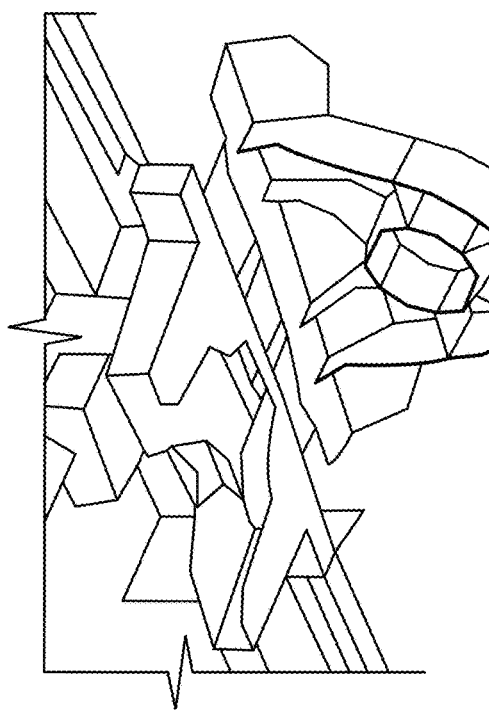
Figure 13A:
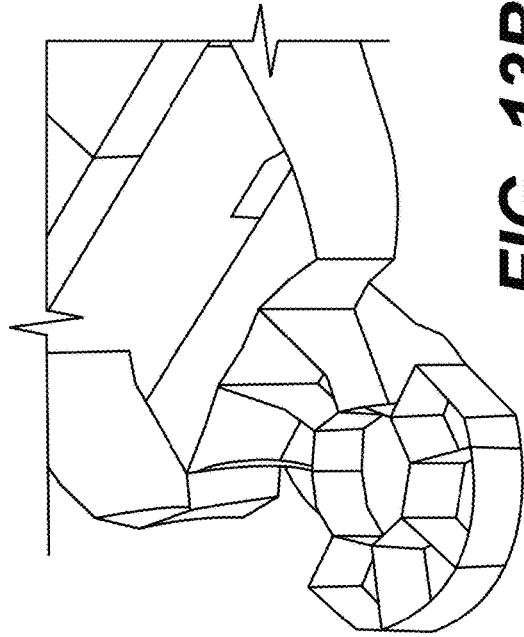
FIGS. 13A-13D show a first deformable bracket at progressive steps of deforming in response to the impact force on the headlight assembly, in accordance with an aspect of the present disclosure.
Figure 13B:
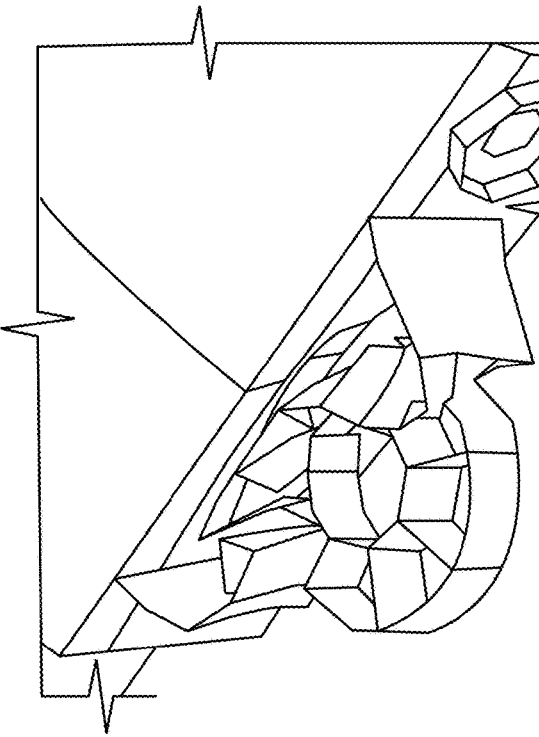
Figure 13C:
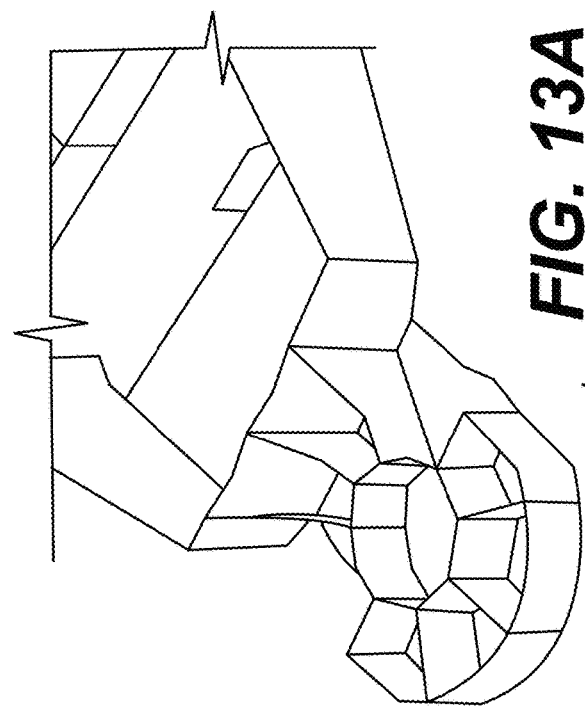
Figure 13D:
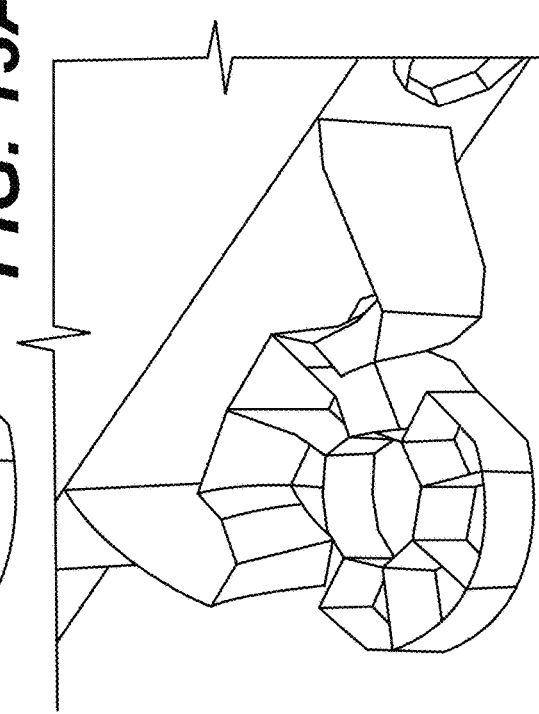
Figure 14A:
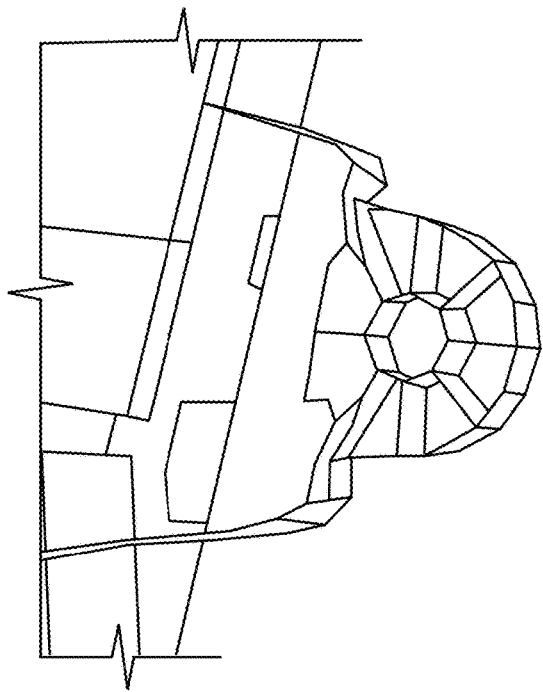
FIGS. 14A-14D show a second deformable bracket at progressive steps of deforming in response to the impact force on the headlight assembly, in accordance with an aspect of the present disclosure.
Figure 14B:
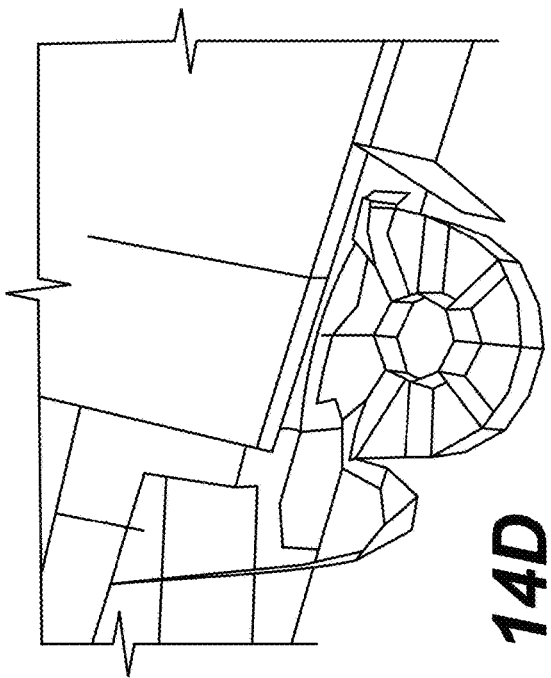
Figure 14C:
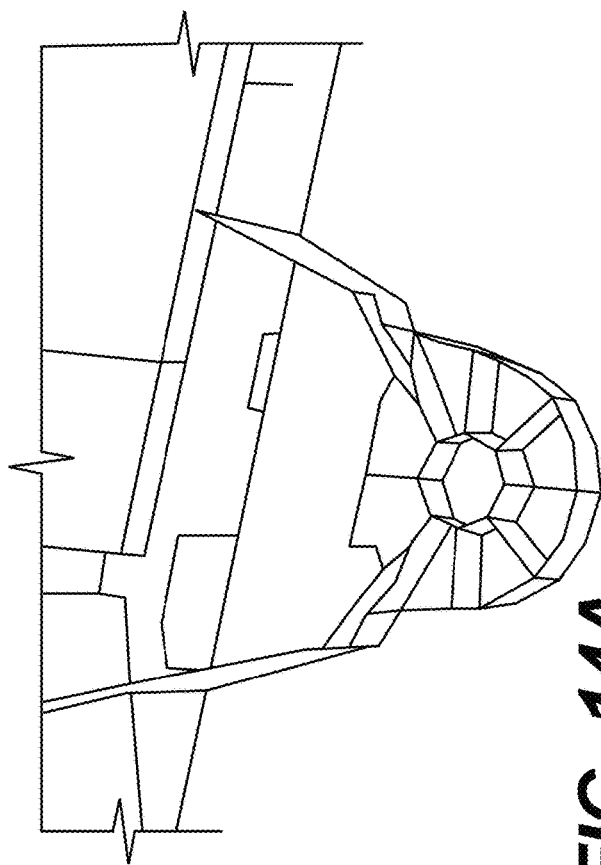
Figure 14D:
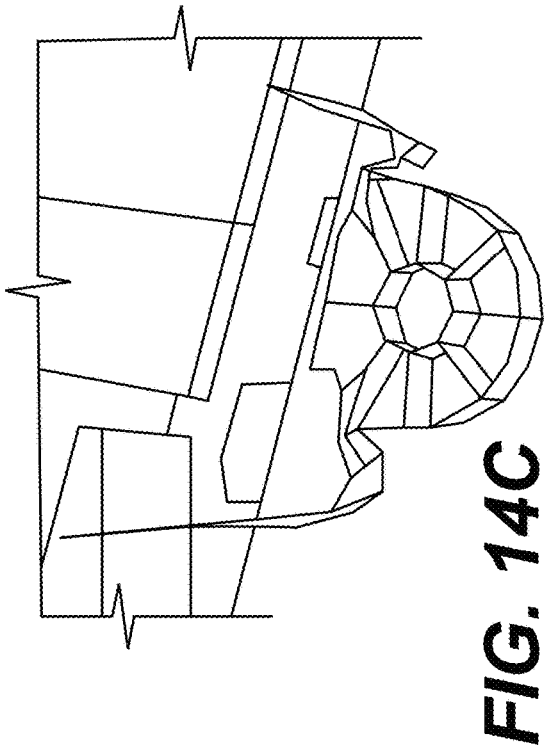

FIG. 10 shows a perspective view of parts of the releasable bracket 30 detaching from one another in response to an impact force. As shown, the impact force causes the beam 51 of the clip 50 to deflect downward and for the latch portion 54 to detach from the cage portion 71, allowing the releasable bracket 30 to separate from the component-side portion 70, and thus for the releasable bracket 30 to move to the detached configuration.

FIGS. 11A-11B show additional views of the cage portion 71 of the releasable bracket 30, including the rectangular aperture 72 configured to receive the clip 50 and the guide arms 52. FIG. 11B also shows the lip 74 of the cage portion 71 facing away from an opening of the rectangular aperture 72 for engaging and retaining the clip 50.

FIGS. 12A-12D show the releasable bracket 30 at progressive steps of detaching in response to an impact force on the headlight assembly. FIGS. 13A-13D show the first deformable bracket 32 at progressive steps of deforming in response to the impact force on the headlight assembly. FIGS. 14A-14D show the second deformable bracket 34 at progressive steps of deforming in response to the impact force on the headlight assembly, in accordance with an aspect of the present disclosure.

In some embodiments, the releasable bracket 30 may be configured to detach in response to application of an impact force of greater than 55 Newtons on the headlight assembly 20. In some embodiments, the brackets 30, 32, 34 may each be configured to withstand an impact force of up to 600 Newtons without breaking. For example, an impact force of up to 600 Newtons may cause the first deformable brackets 32, and the second deformable brackets 34 to be deformed, but not to break. The deformable brackets 32, 34 maybe re-formed to their original position and continue to be used after being deformed (i.e. after being subjected to an impact force of up to 600 Newtons. Forces greater than 600 Newtons may cause permanent damage to one or more of the brackets 30, 32, 34.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A releasable bracket for a headlight assembly of a vehicle, comprising:
    a fixed bracket portion configured to be attached to a structural component of the vehicle; and
    a component-side portion attached to the headlight assembly and configured to engage the fixed bracket portion in a retained position for holding the headlight assembly to the structural component of the vehicle,
    wherein one of the fixed bracket portion or the component-side portion includes a clip, and another one of the fixed bracket portion or the component-side portion includes a cage portion,
    wherein the clip is configured to detach from the cage portion in response to application of an impact force on the headlight assembly, and wherein the clip is configured to re-engage the cage portion and to re-attach the fixed bracket portion to the cage portion after being detached therefrom.

2. The releasable bracket of claim 1, wherein the fixed bracket portion includes the clip and the component-side portion includes the cage portion.

3. The releasable bracket of claim 1, wherein the fixed bracket portion includes the cage portion and the component-side portion includes the clip.

4. The releasable bracket of claim 1, wherein the clip includes a latch portion having a catch surface configured to engage a lip of the cage portion in a retained portion.

5. The releasable bracket of claim 1, wherein the fixed bracket portion includes at least one guide arm configured to fit within an aperture of the cage portion and to guide the clip into position to engage the cage portion in the retained position.

6. The releasable bracket of claim 5, wherein the at least one guide arm includes two guide arms, with the clip disposed between the two guide arms.

7. The releasable bracket of claim 1, wherein the clip is configured to detach from the cage portion in response to the application of the impact force of at least about 55 Newtons.

8. The releasable bracket of claim 1, wherein the headlight assembly includes a housing, and wherein the cage portion is integrally molded with the housing of the headlight assembly.

9. The releasable bracket of claim 1, wherein the clip includes a beam with a catch surface extending therefrom, the catch surface configured to engage a lip of the cage portion in the retained position.

10. The releasable bracket of claim 9, wherein the catch surface defines an angle of greater than 90-degrees relative to the beam of the clip.

11. The releasable bracket of claim 1, further including a spring configured to bias the fixed bracket portion away from the cage portion with the releasable bracket in the retained position.

12. The releasable bracket of claim 11, wherein the spring is integrally molded with the fixed bracket portion.

13. The releasable bracket of claim 11, wherein the spring includes two arc-shaped structures disposed on opposite sides of the clip.

14. A headlight assembly of a vehicle, comprising:
a housing;
at least one deformable bracket configured to hold the housing to a structural component of the vehicle, the deformable bracket configured to deform in response to application of an impact force on the headlight assembly; and
a releasable bracket including:
a fixed bracket portion configured to be attached to a structural component of the vehicle; and
a component-side portion attached to the headlight assembly and configured to engage the fixed bracket portion in a retained position for holding the headlight assembly to the structural component of the vehicle,
wherein one of the fixed bracket portion or the component-side portion includes a clip, and another one of the fixed bracket portion or the component-side portion includes a cage portion,
wherein the clip is configured to detach from the cage portion in response to application of an impact force on the headlight assembly, and
wherein the clip is configured to re-engage the cage portion and to re-attach the fixed bracket portion to the cage portion after being detached therefrom.

15. The headlight assembly of claim 14, wherein the fixed bracket portion includes the clip and the component-side portion includes the cage portion.

16. The headlight assembly of claim 14, wherein the fixed bracket portion includes the cage portion and the component-side portion includes the clip.

17. The headlight assembly of claim 14, wherein the at least one deformable bracket is disposed adjacent to a front surface of the housing, and wherein the releasable bracket is disposed on to a rear surface of the housing.

18. The headlight assembly of claim 14, wherein the at least one deformable bracket includes two or more of the deformable brackets.

19. The headlight assembly of claim 14, wherein the releasable bracket is disposed between two of the two or more of the deformable brackets.

20. A releasable bracket for a headlight assembly of a vehicle, comprising:
a fixed bracket portion including a clip; and
a cage portion attached to the headlight assembly and configured to engage the clip in a retained position for holding the headlight assembly to a structural component of the vehicle,
wherein the clip is configured to detach from the cage portion in response to application of an impact force on the headlight assembly,
wherein the clip is configured to re-engage the cage portion and to re-attach the fixed bracket portion to the cage portion after being detached therefrom, and
wherein the clip includes a latch portion having a catch surface configured to engage a lip of the cage portion in a retained portion.

* * * * *